MEANS AND METHOD FOR INDICATING AND VISIBLY PERMANENTLY RECORDING A MAGNETIC FIELD UTILIZING A MAGNETOSTRICTIVE MATERIAL AND A CHEMICAL REACTION

Filed April 2, 1963 3 Sheets-Sheet 1

Lyne S. Trimble
INVENTOR.
BY
Robert M. McManigal
Attorney

Lyne S. Trimble
INVENTOR.

BY
Robert M. McManigal
Attorney

Lyne S. Trimble
INVENTOR.

BY Robert M. McManigal
Attorney

United States Patent Office 3,281,669

Patented Oct. 25, 1966

3,281,669

MEANS AND METHOD FOR INDICATING AND VISIBLY PERMANENTLY RECORDING A MAGNETIC FIELD UTILIZING A MAGNETOSTRICTIVE MATERIAL AND A CHEMICAL REACTION

Lyne S. Trimble, 4724 Arcola, North Hollywood, Calif.

Filed Apr. 2, 1963, Ser. No. 269,993
14 Claims. (Cl. 324—43)

The present invention relates generally to means for and method of indicating and visibly premanently recording a magnetic field.

Heretofore, the common practice in viewing magnetic fields involved the sprinkling of finely divided magnetic material upon a surface and then suspending the surface within the scope of the lines of flux believed to define the existence of the magnetic field. The detection of magnetic fields by this technique does not provide a permanent image, and in the case of extremely weak fields requires the distribution and control of very tiny magnetic particles. When applied to magnetic recording tapes, these particles become imbedded in ths surface, thus providing an abrasive that will greatly increase wear on information recording and play back heads.

In addition to the above practice, a variety of measuring devices have also been used for indicating the presence of a magnetic field. For example, rapidly rotating conductors that cut lines of magnetic flux will indicate both the presence and the strength of a magnetic field. The Hall effect has been used also as a means of detecting magnetic fields and is the basis of commercial gauss meters. Since magnetic fields can deflect moving electrons, the application of magnetic fields to electron streams in cathode ray tubes has been used to provide a visual display on the face of the tube representing the presence of a magnetized area. Polarized electromagnetic energy can be used to visually observe magnetic domains or changes in magnetic domains in thin films. A discernable but not permanent image is available with this technique. Phosphor coatings applied to magnetized surfaces have been bombarded with electron beams. The magnetic field will deflect the impinging electrons to prevent a phosphor glow in the areas of magnetic information. For the display of magnetic fields on magnetic tapes, none of these techniques will permit the formation of a visible image coincident with the recording of information, nor will they provide a permanent image following recording. All of these techniques have the inherent drawback in that they depend upon the post-treatment of magnetized areas following the placement of information, and all of them provide images under transient viewing conditions requiring photographic or other documentation.

In contrast to the above methods and concepts, this invention utilizes a magnetic field to trigger a chemical reaction productive of a permanent visual change in the area of the magnetic field. There is no pre-treatment, development, or post treatment required. The field can be one that is in existence or one created by an electrical pulse. Image formation is accomplished, in part, by exposing to the magnetic field tiny particles of a substance having the property of magnetostriction, the ability to change physical size in the presence of a magnetic field. The tiny particles are coated with a continuous, brittle, chemically inert film with the property of breaking or becoming discontinuous as the magnetostrictive size change occurs. The rupture of the brittle coating will allow selected color forming chemicals surrounding the particles experiencing this environment to react chemically with the exposed magnetostrictive substance and provide a voluminous colored product to create a visual differential in comparison with areas not exposed to the magnetic field. In this manner, a surface coating containing droplets of color forming chemicals carrying tiny brittle coated magnetostrictive particles will provide a visual image in the presence of a magnetic field.

In its broad concept, the objects of the present invention include:

(a) The provision of means in which magnetic induction is utilized to trigger a chemical reaction and produce a visual change in the area of the magnetic field.

(b) Provision of means for creating a visibly discernible area coincident with a magnetizing action which produces a magnetized area.

(c) The incorporation of a mngnetostrictive substance in a chemical environment within which it would normally react but from which it is protected by virtue of a brittle, relatively nonreactive, continuous surface coating. This coating has the capability of being ruptured or rendered discontinuous in response to size changes in the magnetostrictive substance under the influence of a magnetic field, thus allowing the normal chemical reaction to proceed.

(d) The packaging of brittle coated magnetostrictive particles and a surrounding image forming solution in droplet form in such a manner that the droplet size can be controlled to establish image resolution in an applied coating.

(e) To obtain permanent visible images in color as the result of magnetic field stimulus.

(f) To provide for a coating that can be applied to a supporting medium to disclose the presence of a magnetic field either present at the time of application or created later.

(g) Provision of means for making visually discernible, magnetic fields or field patterns existing at a measurable level in magnetic recording materials, whether such pattern be of digital nature, analogue nature, or merely discontinuous areas exhibiting magnetic fields.

(h) The application of coatings to magnetic recording materials capable of magnetic field stimulation to cause visible images to appear on or within such coatings.

(i) Provision of coatings on thin supporting media that may be bonded to, and if necessary later removed from, surfaces believed to contain magnetic fields so that a visual image can be produced on or within the applied material which, if removed, can be separately inspected by either reflection or transmission viewing.

(j) Arrange for magnetic materials or magnetic areas of magnetic tape to trigger a chemical reaction productive of a visual image in the area of the magnetic field.

(k) The provision of a visible image in areas of magnetic fields where the visual density or image intensity is proportional to the intensity of the magnetic field.

(l) The provision of visual images of magnetic fields with a resolution equal to the magnetic recording resolution.

Further objects of the invention will be brought out in the following part of the specification, wherein detailed description is for the purpose of fully disclosing the invention without placing limitations thereon.

Referring to the accompanying drawings, which are for illustrative purposes only:

Figures 1, 2:
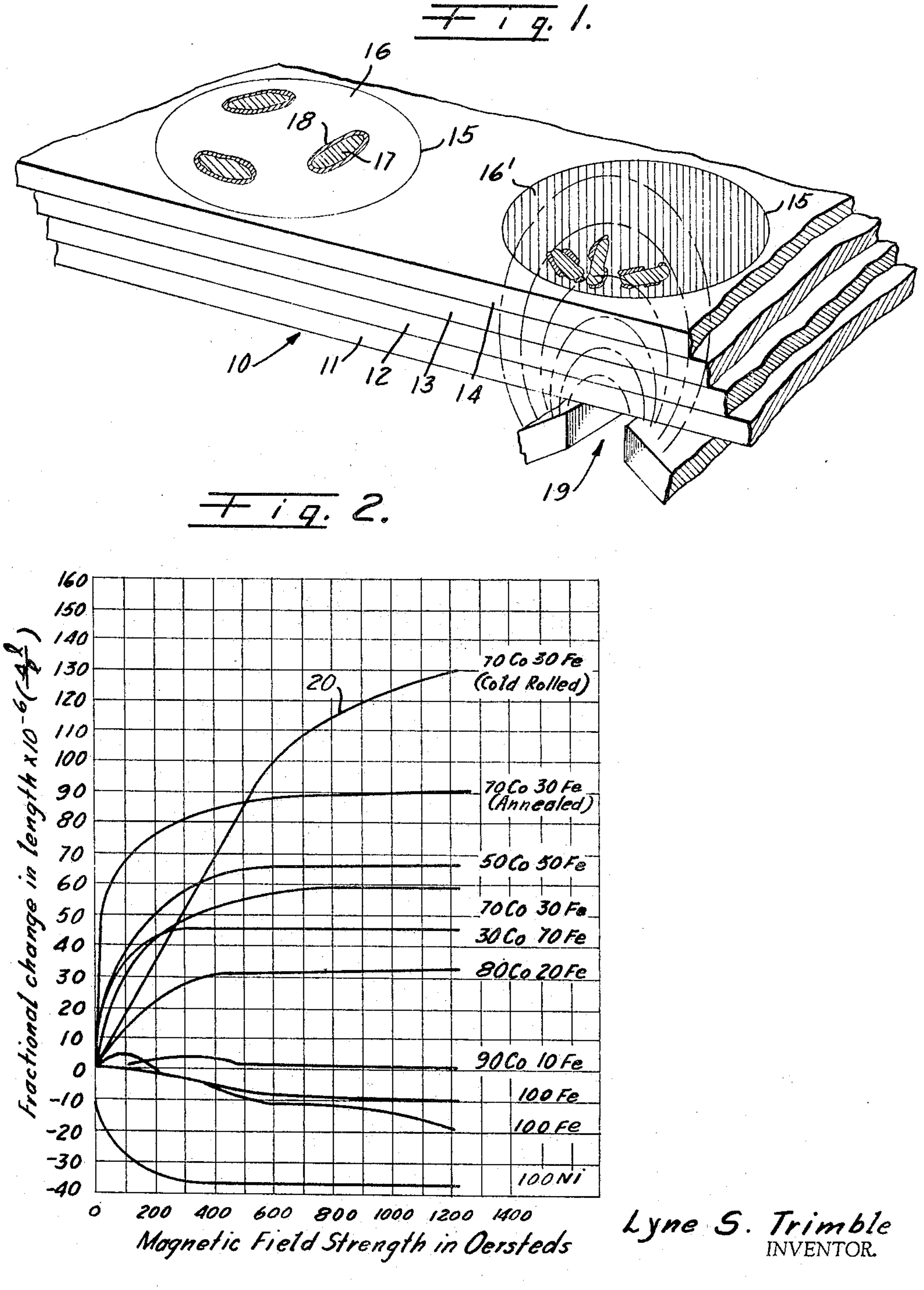
FIG. 1 is an enlarged (high magnified) fragmentary view of a composite tape structure embodying the features of the present invention and schematically illustrating the action when subjected to a magnetic field.
FIG. 2 is a graph showing the effect of cold rolling upon magnetostriction.

Referring more specially to the drawings, the basic concept of the present invention will be explained primarily by reference to FIGURE 1, wherein the invention has been embodied in a composite tape structure as generally indicated by the numeral 10.

Briefly, the tape structure is shown in this embodiment as including the usual strip or supporting medium 11 of plastic or other suitable material having a coating 12 thereon of magnetic recording material such as the red oxide commonly used in magnetic recording tapes.

This red oxide surface is coated with a layer 13 of highly reflective material of the class including lead oxide and titanium dioxide. It has been found that a two and one-half to five micron coating thickness is generally sufficient to provide coverage over the red oxide. The coating layer 13 is followed by a further coating layer 14 of approximately fifteen microns in thickness of a resin medium which provides a carrier for minute water phase droplets as diagrammatically represented in highly magnified form by the numeral 15. These droplets, in so far as possible, form a single layer of closely adjacent water phase spheres containing a color forming fluid mixture 16 in which a plurality of tiny particles 17 are freely movable.

The particles 17 are of a magnetostrictive material which will respond to the presence of a magnetic field and change the physical size of the particle. These tiny particles are covered with a shell or coating 18 of a brittle material which is inert to the color forming fluid mixture 16 and normally separates and prevents the particles 17 from chemically reacting with the color forming mixture. In the presence of a magnetic field, however, the change in particle size causes rupture of the shell or coating 18, thus permitting the chemical reaction between the particle and the color forming mixture to take place and produce a voluminous colored product 16' within the droplets 15, which will create a visual differential in comparison with areas which have not been exposed to the magnetic field.

If desired, a further resin coating (not shown) of two to five microns in thickness may be applied over the coating layer 14 as a protective measure.

With a tape structure 10, as briefly described above, simultaneous magnetic recordings and corresponding visual records can be simultaneously produced when the tape is moved past a recording head, as generally indicated at 19. The recording head may be positioned on the tape side adjacent the supporting medium 11, as shown, or on the opposite side adjacent the coating layer 14 in which case better resolution will be obtained.

Having briefly described my invention in its broad concepts, the specific details pertaining to the various elements and the procedural steps in their fabrication and production will now be described.

Figure 3:
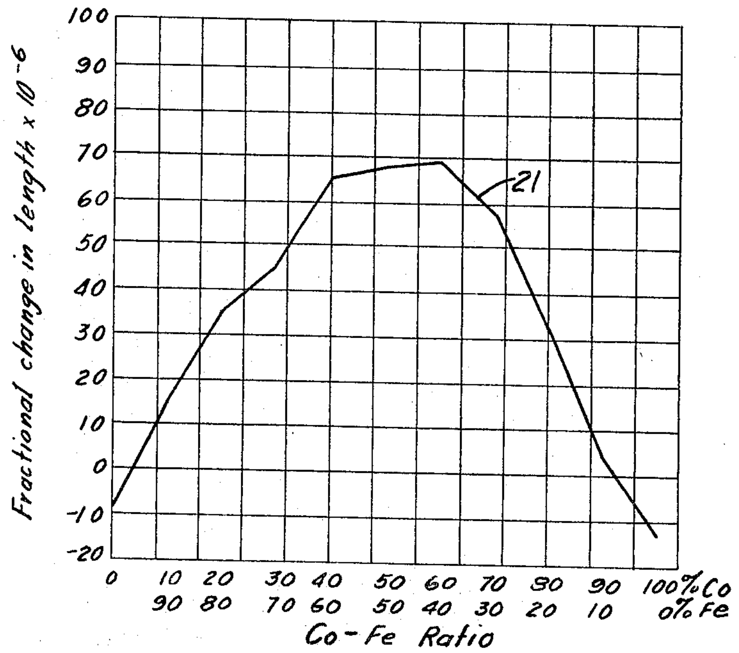
FIG. 3 is a graph illustrating the effect of the cobalt iron ratio upon magnetostriction.

The magnetostrictive substance used for the particles 17 may comprise any one of the class of metals including iron, cobalt and nickel, as well as solid solutions of these metals. In one procedure, a solid solution or alloy of the order 70% cobalt metal and 30% iron metal is prepared in ingot form by forging. The forged material is cold-rolled by a factor of 40 to 1 into a thin film without annealing in order to obtain maximum magnetostriction. As will be evident from the graphs in FIG. 2, curve 20 indicates the desirable effects of cold-rolling to produce a material having an extremely high magnetostrictive characteristic particularly in the higher regions of magnetic field strength. While good results have been obtained with the 70% cobalt 30% iron ratio, other ratios may satisfactorily be used, as indicated by curve 21 in the graph of FIG. 3 showing generally the amount of change which can be expected. The thin film is then converted to powder form by any abrasion method that does not permit reaching the annealing temperature of the cobalt iron.

As an alternative, the forged material can be directly converted into powder form by any one of a number of methods, such as filing, ball-milling, melting and blowing out through a water jet, or dispersion through a plasma gun. The particles so prepared can be cold-rolled in any convenient manner. A three-roller paint mill has been found to be satisfactory in providing the 40 to 1 reduction. If the finely divided cobalt iron particles approximate 5 microns in size, a final visual resolution approximating 300 pulses per inch can be obtained.

The magnetostrictive substance in the particles may also comprise any one of the class of materials known as ferrites, and having the general composition $MOFe_2O_3$ where M stands for Mn, Fe, Co, Ni, Zn, or combinations of these metals with or without oxygen in various proportions, in as much as combinations exhibit a change in size under the influence of a magnetic field. Ferrites contain the trivalent iron ions and the oxygen ions in the ratio of two to four. The divalent ion can be any metal whose atom is small enough to fit into the crystal lattice, so that a general formula could also be $M^{++}Fe^{++}O_4$. Larger molecular structures are known as ferrimagnetic garnets and utilize gadolinium, samarium, or yttrium; these exhibit the same sort of internal shifts under the influence of a magnetic field, as occur in ferrite crystals and therefore, are magnetostrictive. Good results have been obtained with medium zinc ferrites of composition $Co_{0.3}Zn_{0.2}Fe_{2.2}O_4$ or with cobalt ferrite of composition $Co_{0.8}Fe_{2.2}O_4$. Similar materials can be prepared in a range of compositions and in fine powder-form by flame fusion techniques. Since they are brittle, tiny particles can be obtained from large crystals by physical impact. Some ferrites show an expansion as the major physical change under magnetic field stimulation; other ferrites show a contraction as the major physical change under magnetic field stimulation. Cold rolling is not necessary with ferrites.

The brittle shell or coating 18 may comprise metals of the class of antimony, bismuth, or arsenic, singly or in combination Other materials in related classes can be utilized also, since the purpose of the coating is to exhibit extreme brittle characteristics in thin film form, to be chemically resistant, and possess thermal expansion characteristics matching those of the selected magnetostrictive material. The magnetostrictive metal particles are graded in size to insure meeting the desired resolution requirements of the final product, and a substantially uniform coating of brittle material applied to them. The coating can be applied by vapor deposition, by electroless plating techniques, by methods involving high temperature reduction, displacement, or thermal decomposition, as well as by any commercial technique capable of providing thin films around small particles. With certain of these techniques, it is necessary to follow the coating operation with a heating step, for example, by heating to a sufficiently high temperature for a brief period to insure a non-porous coating and seal any microcracks. The thickness of the applied coating is so chosen that when the magnetostrictive size change occurs, a discontinuity or break in the brittle film occurs sufficient to permit chemicals surrounding the particle to react with the magnetostrictive material.

Figure 4:
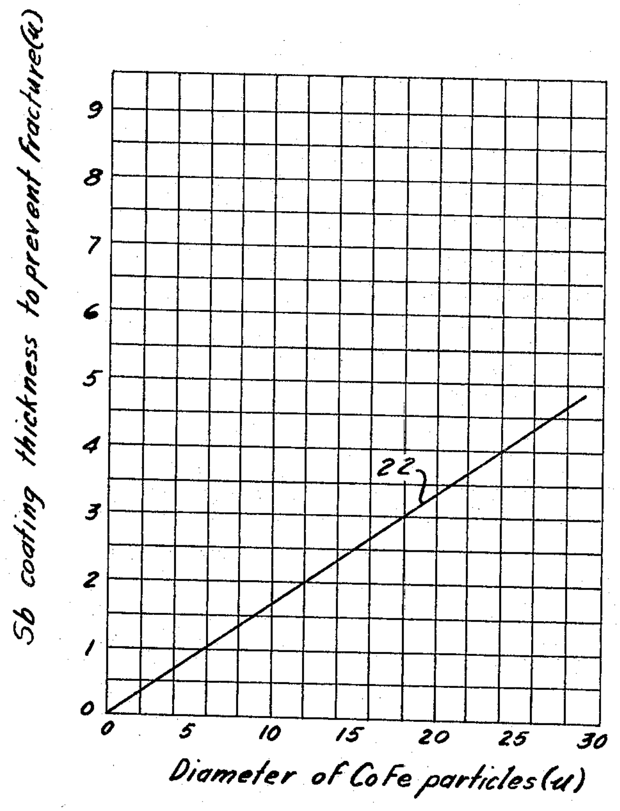
FIG. 4 is a graph showing the relationship between particle diameter and coating thickness.

As shown in the graph of FIG. 4 a definite relationship has been found to exist between the particle diameter and the coating thickness which will just prevent fracture of the coating in a magnetic field. This relationship as shown by the line 22 in FIG. 4 is a linear function and permits a finite determination of the proper coating thickness for a desired particle size.

Figure 5:
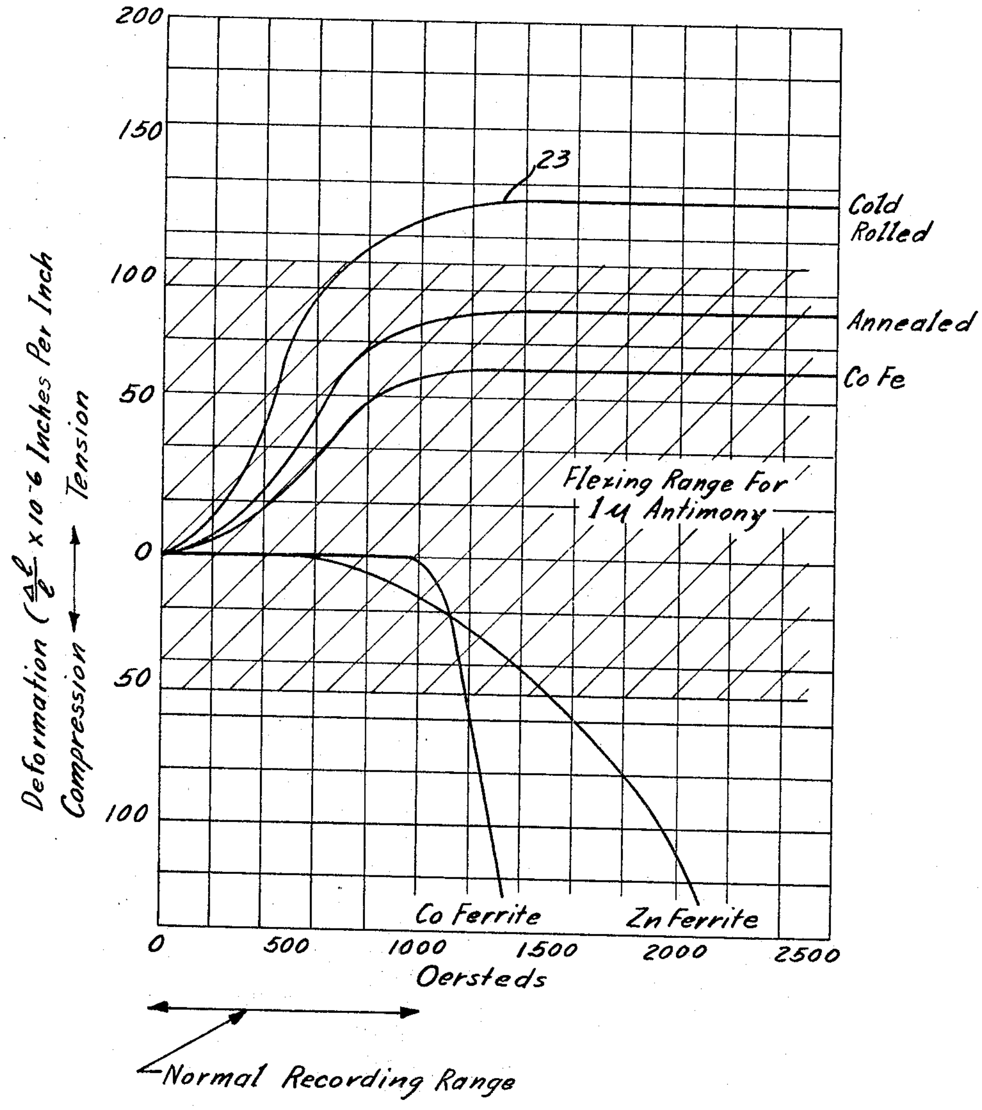
FIG. 5 is also a graph showing the effect produced by magnetostriction, as it is influenced by the magnetic field strength in oersteds.

The graph in FIG. 5 shows the relationship between the effect produced by magnetostriction as it is influenced by the magnetic field strength in oersteds, and further indicates that at certain field strengths the flexing range for antimony may be exceeded. For example, cold-rolled cobalt iron, as indicated by the curve 23, will exceed the antimony flexing range within the normal magnetic recording range indicated as extending between 0 and 1000 oersteds. It will also be seen that ferrites respond at fields higher than available in the normal magnetic recording range. For particles in the 2 to 5 micron size range, a coating thickness of from ¼ to 1 micron of antimony has been found satisfactory. Such a coating will rupture by expansion at 110 micro-inches per inch, or by compression at 50 micro-inches per inch.

The chemicals of the color forming fluid mixture 16 surrounding the coated particle or particles may be chosen from any number of substances that will react with the magnetostrictive material to provide a chemical change yielding a visible product. The oxidization of the magnetostrictive material can be achieved with a number of oxidizing agents as long as they are not highly colored in the strengths required to be used. Ferricyanides and dichromates are satisfactory, however, best results have been obtained using acids with sufficient activity to react with the magnetostrictive substance and produce metal ions. Although organic acids like formic acid can be used, the preferred form utilizes mineral acids like dilute hydrochloric acid. The color forming compounds can be organic as well as inorganic, which are suitable for the colorimetric detection of metal ions in small quantities. Substances like 2,2′ bipyridine and 1 nitroso, 2 napthol-3, 6 disulfonic acid, disodium salt are examples of satisfactory color formers. The preferred color forming chemical is 2,2′ biypridine. The color forming chemicals, together with the oxidizing agent or acid, are incorporated with glycerin or one of a similar class of materials that has high water miscibility and high viscosity. The glycerin does not enter into the chemical activity but is present to aid in the formation of color forming droplets 15 as hereinafter described. The concentration levels are adjusted so that the activity with antimony is negligible.

The coated magnetostrictive particles 17 and the color forming chemicals can be incorporated into the tiny droplets 15 of liquid and suspended in a resin suitable for application as a coating to opaque or transparent materials. The particles are added to the water phase, and by controlling the rate of water phase and resin phase mixture, as well as the rate of agitation during mixing, tiny droplets of water phase material containing magnetostrictive particles can be created and suspended in the organic resin. For example, the coated particles can be created by suspending in a water solution containing approximately 25% glycerin, 0.05 molar hydrochloric acid and 0.05 molar 2.2′ bipyridine. This solution is stirred with an acrylic co-polymer under conditions of controlled agitation so that a suspnsion of tiny water phase droplets are created in the co-polymer. The tiny globular droplets are approximately 15 microns in diameter and each droplet will thus contain from 1 to 4 coated particles together with the color-forming chemicals necessary to provide a visible change under the influence of a magnetic field. The quantities utilized are not critical to the preparation and depend upon the desired final coating requirements.

The resin can be an acrylic co-polymer such as that resulting from a combination of methyl methacrylate and ethyl methacrylate, or a vinyl base material can be used such as vinyl chloride acetate co-polymer. Other resins of related classes can be utilized since the purpose of the resin is to act as a carrier for the tiny color forming droplets and to provide a means of obtaining a uniform coating by standard coating techniques coupled with suitable surface wear characteristics.

The droplet carrying resin co-polymer can be applied as a coating over the magnetic recording surface or coating 12. The coating technique does not appear to be critical and ordinary draw down bar coatings are satisfactory. An overcoating of a clear resin co-polymer has been found to be desirable in that it increases resistance to handling and abrasion. In the utilization of the preferred form of this invention, the formation of a color area defining a magnetic field is induced by the following sequence: An applied magnetic recording field causes an expansion of the cobalt iron particles; the brittle antimony film is ruptured by this expansion; the hydrochloric acid oxidizes the cobalt iron metal, and the ferrous ions resulting from this oxidation combine with the 2,2′ bipyridine in the water solution to form ferrous bipyridine which is bright red. With the chemical concentrations set forth above, the reaction is spontaneous and the visual image forms instantly. Resolution of the visual image depends upon the magnetic recording resolution and the droplet size. In the practice of the invention, brittle coated magnetostrictive particles suspended in color forming chemicals have been found to react with the formation of color in response to a wide variety of magnetic field strengths from a few oersteds up through 7000 oersteds, and from magnetic field sources ranging from bar magnets to a magnetic pulse of five microseconds duration, typical of common magnetic tape recording. The formation of a visible image is immediately evident and the color is clearly discernible in a transparent film or against a white background. Although the preferred form has detailed image creation through the formation of substances selectively absorbing energy, the invention is equally applicable to image creation by the destruction of substances selectively absorbing energy. It is only necessary that the chemicals released following magnetostrictive activity act to decolorize a material contained in the water droplet. If the magnetostrictive material is a zinc ferrite and the water droplets have been formed in the resin layer to contain the bright red ferrous bipyridine, then the release of zinc ions will result in the destruction of the red color due to the formation of a colorless zinc bipyridine. It is thus possible to utilize the invention to form an image having a different selective absorption than the background.

The foregoing description of the uses, advantages and operation of this invention has been directed toward application on magnetic tape, however, it is to be understood that the invention is equally applicable to use on transparent or opaque materials not necessarily involving magnetic tape or reflection coatings.

Various modifications may suggest themselves to those skilled in the art without departing from the spirit of my invention, and hence, I do not wish to be restricted to the specific forms shown or uses mentioned, except to the extent indicated in the appended claims.

I claim:

1. The process of obtaining a visible image of a magnetic field, which comprises the steps of: confining a magnetostrictive substance within a brittle shell of relatively inert material capable of being ruptured by the change in said substance under the influences of a magnetic field; surrounding the shell with a chemical environment capable of reacting with said substance; and thereafter rupturing the shell by subjecting the substance to a magnetic field so as to permit a chemical reaction between the exposed magnetostrictive substance and the chemical environment.

2. The method of visibly indicating magnetically recorded information on a tape, which comprises the step of: contacting said tape with a separate medium containing a coating media in which image forming chemical reactions are initiated due to said contact by the magnetic fields produced by said recorded information.

3. The method of creating a visible pattern accurately portraying the existence of a magnetic field which comprises the steps of:

(a) forming tiny particles of magnetostrictive material from a cold-rolled thin film of alloy containing cobalt and iron substantially in the ratio of 70% to 30% respectively;
(b) coating the particles with antimony to a thickness of substantially 1/6 that of the particle diameter;
(c) heating the coated particles to a temperature sufficient to seal and render the coating non-porous;
(d) forming a water-phase solution by mixing the coated particles thus treated in the ratio of 1.5 parts by weight with substantially 100 parts by weight of a solution containing approximately 25% glycerine, 0.05 molar hydrochloric acid and 0.05 molar 2.2′ bipyridine;
(e) forming a suspension of water droplets by stirring 1 part by weight of the water-phase solution and adding thereto in a continuous stream 2½ parts by weight of acrylic co-polymer phase;
(f) coating a supporting medium with a resin containing the water droplets to form a film of approximately 15 microns in thickness; and
(g) subjecting the film coating to a magnetic field.

4. The method according to claim 3 in which the acrylic co-polymer phase comprises a combination of methyl methacrylate and ethyl methacrylate.

5. The method according to claim 3 in which the acrylic co-polymer phase comprises vinyl chloride acetate copolymer.

6. Magnetic field indicating means, comprising: a magnetostrictive substance; and a brittle coating for said substance of relatively inert metal capable of being ruptured by changes in said substance under the influence of a magnetic field, said coated substance being surrounded by a chemical environment capable of reacting with said substance upon rupture.

7. A resin coating material containing small water phase droplets, each comprising color forming chemicals and a protectively shielded magnetostrictive substance adapted upon exposure to react with said chemicals and form a visible color in said droplets.

8. A coating material for indicating the presence of a magnetic field, comprising: minute water phase droplets, each containing a color forming chemical and mobile particles therein of a magnetostrictive substance, said particles being confined within and normally protected from reacting with said chemicals by a frangible covering.

9. A coating material for indicating the presence of a magnetic field, comprising: minute water phase droplets, each containing a color forming chemical and particles of a magnetostrictive substance, said particles being confined within and normally protected from reacting with said chemical by a frangible covering.

10. A transparent supporting medium having a white coating of a density suitable to form a reflecting surface, and a second coating of image forming elements on said first coating operable under the influence of a magnetic field to form an image visible against said reflecting surface.

11. A combination magnetic recording tape having adjacent substantially coextensive layers of materials respectively reactable to the influence of a magnetic field simultaneously applied to adjacent areas of said layers, the materials of one of said layers forming permanently magnetized area indicative of said field and the materials in the other of said layers forming in response to said magnetic field visible color image areas indicative of said field.

12. Magnetic indicating means composed of a magnetostrictive metal substance selected from the group consisting of magnesium, iron, cobalt, nickel and zinc, coated with a metal shell selected from the group consisting of antimony, bismuth and arsenic, and a surrounding color forming acid mixture which will chemically react with the magnetostrictive substance selected from the group consisting of 2,2′ bipyridine and 1 nitroso, 2 naphthol-3, 6 disulfonic acid, disodium salt.

13. The method of creating a visible pattern accurately portraying the existence of a magnetic field which comprises the steps of:
(a) forming tiny particles of a magnetostrictive ferrite material;
(b) coating the particles with antimony to a thickness of substantially 1/6 that of the particle diameter;
(c) forming a water-phase solution by mixing the coated particles thus treated in the ratio of 1.5 parts by weight with substantially 100 parts by weight of a solution containing approximately 25% glycerine, 0.05 molar hydrochloric acid and 0.05 molar 2.2′ bipyridine;
(d) forming a suspension of water droplets by stirring 1 part by weight of the water-phase solution and adding thereto in a continuous stream 2½ parts by weight of acrylic co-polymer phase;
(e) coating a supporting medium with a resin containing the water droplets to form a film of approximately 15 microns in thickness; and
(f) subjecting the film coating to a magnetic field.

14. Magnetic indicating means composed of a magnetostrictive ferrite substance coated with a metal shell selected from the group consisting of antimony, bismuth and arsenic, and a surrounding color forming acid mixture which will chemically react with the magnetostrictive substance selected from the group consisting of 2,2′ bipyridine and 1 nitroso, 2 naphthol-3, 6 disulfonic acid, disodium salt.

References Cited by the Examiner

UNITED STATES PATENTS

| | | | |
|---|---|---|---|
| 2,656,284 | 10/1953 | Toulmin | 117—50 |
| 2,677,728 | 5/1954 | Kolb et al. | 324—34 |
| 2,848,748 | 8/1958 | Crump | 324—43 |
| 2,866,155 | 12/1958 | Martin | 324—47 |
| 2,910,963 | 11/1959 | Herman | 118—623 |
| 2,971,916 | 2/1961 | Schleicher et al. | 346—74 |
| 3,017,256 | 1/1962 | Richardson | 324—34 |
| 3,144,650 | 8/1964 | Levine | 117—1.7 |
| 3,195,433 | 7/1965 | Fernald | 95—53 |

OTHER REFERENCES

The Philosophical Magazine, vol. 8, No. 51, October 1929, pages 457–473, inclusive.

WALTER L. CARLSON, *Primary Examiner.*

RICHARD B. WILKINSON, *Examiner.*

R. J. CORCORAN, *Assistant Examiner.*